US011224975B2

(12) United States Patent
Leonardi et al.

(10) Patent No.: US 11,224,975 B2
(45) Date of Patent: Jan. 18, 2022

(54) IMPULSE ELECTRICALLY GENERATED FORCE SEPARATION OF BLANKS FOR THE AUTOMATED DESTACKING OF METAL SHEET

(71) Applicant: Ford Global Technologies, LLC, Dearborn, MI (US)

(72) Inventors: Franco Leonardi, Dearborn Heights, MI (US); Michael Degner, Novi, MI (US); S. George Luckey, Jr., Dearborn, MI (US); Chris Wolf, Ann Arbor, MI (US); Alan Gillard, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 16/168,026

(22) Filed: Oct. 23, 2018

(65) Prior Publication Data

US 2020/0122341 A1   Apr. 23, 2020

(51) Int. Cl.
*B25J 15/06* (2006.01)
*B23Q 3/15* (2006.01)

(52) U.S. Cl.
CPC .......... *B25J 15/0608* (2013.01); *B23Q 3/15* (2013.01)

(58) Field of Classification Search
CPC ....... B21D 43/24; B25J 15/06; B25J 15/0616; B25J 15/065; B25J 15/0666; B25J 15/0675; B65G 59/04; B65H 3/46

(Continued)

(56) References Cited

U.S. PATENT DOCUMENTS

| 1,716,602 A | * | 6/1929 | Ross | B21D 43/24 |
| | | | | 271/18.1 |
| 2,650,092 A | * | 8/1953 | Wall | B21D 43/24 |
| | | | | 271/18.1 |

(Continued)

FOREIGN PATENT DOCUMENTS

| GB | 2462499 | 2/2010 |
| JP | S6322447 | 1/1988 |

(Continued)

OTHER PUBLICATIONS

Atlas Technologies, Automated Aluminum & Steel Destacking Solutions, available at URL http://www.atlastechnologies.com/wp-content/themes/atlastechnologies/docs/FrontOfLineDestackingSolutions.pdf.

*Primary Examiner* — Saul Rodriguez
*Assistant Examiner* — Brendan P Tighe
(74) *Attorney, Agent, or Firm* — Burris Law, PLLC

(57) ABSTRACT

A method of separating a blank from a stack of blanks is provided and includes grasping a first blank and moving the first blank away from a plurality of blanks. At least one additional blank from the plurality of blanks is adhered to the first blank to form a sub-stack of blanks and at least one impulse electrically generated force (EGF) is applied to separate the at least one additional blank from the first blank. The first blank may be grasped by a device with a force F1, and the at least one impulse EGF may be less than the force F1. Also, the at least one impulse EGF may be applied to separate the at least one additional blank from the first blank by passing a pulse of current through an EGF generator positioned adjacent the first blank and inducing an EGF within the plurality of blanks.

17 Claims, 7 Drawing Sheets

(58) Field of Classification Search
USPC .......................................... 271/18.1; 414/797
See application file for complete search history.

(56) References Cited

U.S. PATENT DOCUMENTS

| | | | |
|---|---|---|---|
| 6,468,025 | B1 | 10/2002 | Stumpf et al. |
| 6,588,580 | B2 * | 7/2003 | Janzen .................. B65G 15/58 198/689.1 |
| 7,792,609 | B2 | 9/2010 | Strasser et al. |
| 2018/0105373 | A1 * | 4/2018 | Golovashchenko ... B65G 47/92 |
| 2018/0193899 | A1 * | 7/2018 | Kizilkan .................. B65H 3/60 |
| 2019/0366417 | A1 * | 12/2019 | Dively .................. B21D 43/24 |

FOREIGN PATENT DOCUMENTS

| | | | |
|---|---|---|---|
| JP | 4919071 | | 4/2012 |
| SU | 1712286 | A1 * | 2/1992 |

\* cited by examiner

IMPULSE ELECTRICALLY GENERATED FORCE SEPARATION OF BLANKS FOR THE AUTOMATED DESTACKING OF METAL SHEET

FIELD

The present disclosure relates to a material handling machine and method, and more particularly to an apparatus and a method for separating blanks.

BACKGROUND

The statements in this section merely provide background information related to the present disclosure and may not constitute prior art.

In a material forming operation, such as a stamping operation, a stack of blanks is generally positioned in proximity to a stamping press and automatically fed into the stamping press by a material handling machine, such as a material handling robot. Tool and die surfaces of the stamping press receive the blanks and form the blanks into a desired shape. The robot includes an end-effector, which is moved to a position above the stack of blanks, grasps and lifts the uppermost blank from the stack, and feeds the uppermost blank into the stamping press or onto a conveyor that transports the uppermost blank to the stamping press.

To facilitate the grasping operation of the end-effector, the stack of blanks may be de-stacked or separated before the end-effector grasps the uppermost blank. Typical de-stacking methods are not suitable for high-volume manufacturing cycle times which require automated, rapid, and robust blank de-stacking. Also, if two or more blanks are picked up by the robot, the system experiences a disruption and stops the production line, resulting in downtime of the manufacturing process.

Moreover, typical de-stacking methods are not suitable for picking up a variety of blank materials and of varying dimensions. For example, a typical de-stacking method that works with steel blanks may not work with aluminum blanks.

These issues associated with de-stacking equipment relative to material blanks, and the limitation of only certain materials being handled, are addressed by the present disclosure.

SUMMARY

In one form of the present disclosure, a method of separating a blank from a stack of blanks is provided and includes grasping a first blank and moving the first blank away from a plurality of blanks. At least one additional blank from the plurality of blanks is adhered to the first blank to form a sub-stack of blanks and at least one impulse electrically generated force (EGF) is applied to separate the at least one additional blank from the first blank. The first blank may be grasped by a device with a force F1, and the at least one impulse EGF may be less than the force F1. Also, the at least one impulse EGF may be applied to separate the at least one additional blank from the first blank by passing a pulse of current through an EGF generator positioned adjacent the first blank and inducing an EGF within the plurality of blanks. The EGF generator may comprise a coil positioned adjacent the first blank.

In some aspects of the present disclosure the at least one impulse EGF is a sequence of impulse EGFs separating the at least one additional blank from the first blank. In such aspects, the sequence of impulse EGFs may be generated by passing a sequence of current pulses through an EGF generator positioned adjacent the first blank. In the alternative, or in addition to, the sequence of impulse EGFs may be generated by passing a sequence of current pulses through a plurality of impulse EGF generators spaced apart from each other and positioned adjacent the first blank. The plurality of impulse EGF generators may be activated in a sequence to apply the sequence of impulse EGFs that separates the at least one additional blank from the first blank. A current magnitude in the sequence of current pulses may be a current magnitude that increases over a time period, a current magnitude that decreases over a time period, or a current magnitude that is modulated over a time period. Also, the plurality of impulse EGF generators may be disposed along one or more edges of the first blank. In the alternative, or in addition to, the plurality of impulse EGF generators may be disposed in a matrix across the first blank.

The at least one impulse EGF may be created by inducing a current within an EGF generator coupled to movement of a device that grasps the first blank and/or the at least one impulse EGF may be created by inducing a current within an EGF generator disposed proximate to and spaced apart from a device that grasps the first blank. The at least one impulse EGF may be applied by an impulse EGF generator that does not contact the blanks and the at least one impulse EGF may elastically deform at least one blank but not plastically deform the at least one blank.

In another form of the present disclosure, a method of separating blanks includes grasping a first blank and moving the first blank with at least one additional blank adhered thereto away from a plurality of blanks. The at least one additional blank adhered to the first blank forms a sub-stack of blanks. Current is passed through at least one EGF generator positioned adjacent the first blank and the current passing through the EGF generator generates at least one impulse EGF within the sub-stack to separate the at least one additional blank from the first blank. In some aspects of the present disclosure, the at least one impulse EGF is a sequence of impulse EGFs separating the at least one additional blank from the first blank. Also, the at least one EGF generator may be a plurality of EGF generators, for example, a plurality of impulse EGF generators disposed along edges of the first blank or a plurality of impulse EGF generators disposed in a matrix across the first blank.

In still another form of the present disclosure, a method of separating blanks includes grasping a first blank with a force F1 and moving the first blank with at least one additional blank adhered thereto away from a plurality of blanks. The first blank and the at least one additional blank adhered thereto form a sub-stack of blanks and at least one impulse EGF is generated within the sub-stack of blanks by at least one EGF generator positioned adjacent the first blank. The impulse EGF is less than the force F1 and separates the at least one additional blank from the first blank. In some aspects of the present disclosure, the at least one impulse EGF is a plurality of impulse EGFs generated by a plurality of EGF generators spaced apart from each other and positioned adjacent the first blank.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
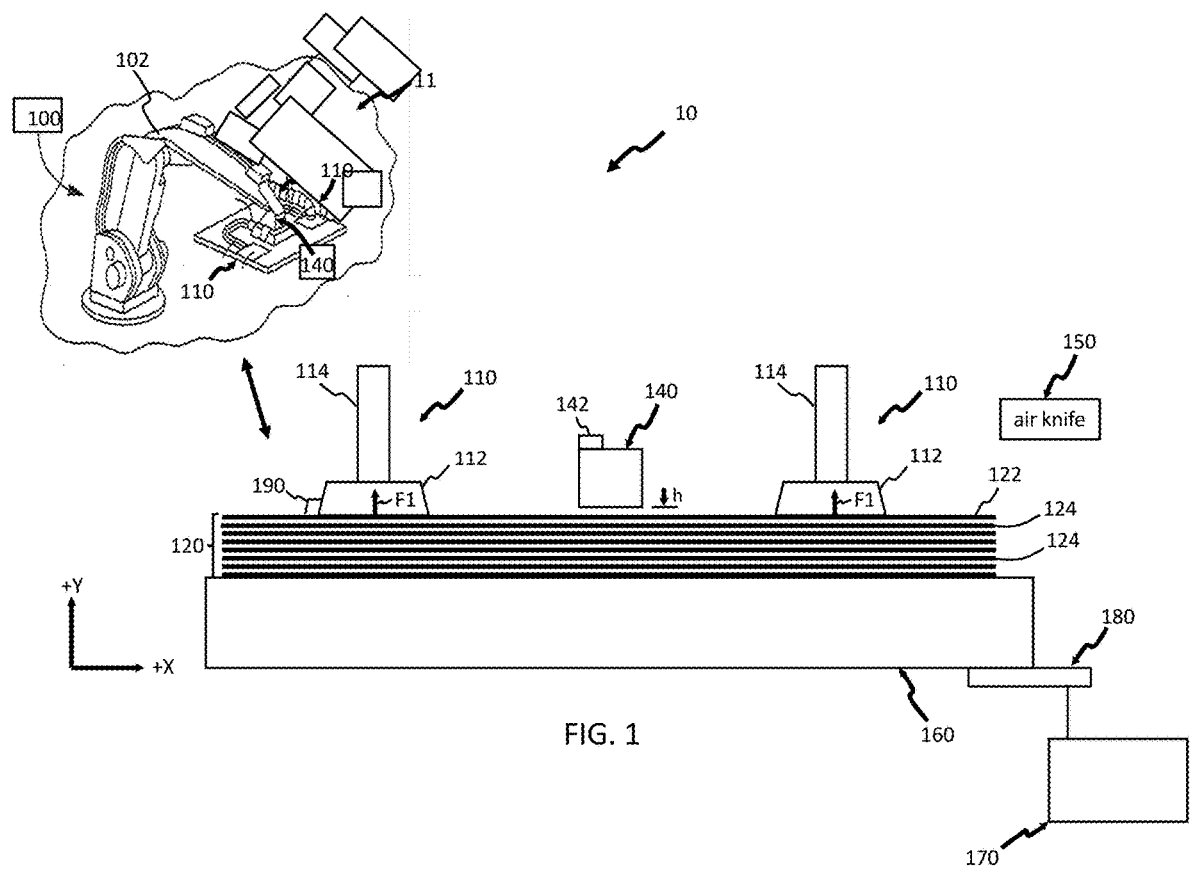
FIG. 1 is a schematic side view of an apparatus for separating a blank from a stack of blanks constructed in accordance with the teachings of the present disclosure.

Referring to FIG. 1, a material handling apparatus 10 for separating a first blank 122 from a stack of blanks 120 and moving the separated first blank 122 to a desired location in accordance with the teachings of the present disclosure is shown. The stack of blanks is formed from a plurality of blanks 124 and the material handling apparatus 10 in one form is used as part of a stamping press (not shown) in a manufacturing operation using conductive blanks formed from materials such as aluminum, aluminum alloys, steel alloys, and the like. Generally, the material handling apparatus 10 includes a transport mechanism, such as a robot 100, an end-effector 110, an impulse electrically generated force (EGF) generator 140, and a jig 160 for holding and supporting the stack of blanks 120. As used herein, the term "impulse" refers to an EGF or current that is not constant as a function of time.

The robot 100 may include a robot arm 102 with the end-effector 110 attached to the robot arm 102. The end-effector 110 may include one or more suction cups 112 supplied with a vacuum via a hose 114 such that the end-effector 110 applies a suction force F1 to the first blank 122 and thereby securely grasps and moves the first blank 122 away from the stack of blanks 120. Alternatively, the end-effector 110 may include a multi-fingered gripper (not shown) or any conventional means that can grasp the first blank with a force F1 and move the first blank 122 away from the stack of blanks 120. The first blank 122 is moved by the end-effector 110 and fed into a stamping press (not shown) or a conveyor (not shown) that transports the first blank 122 to the stamping press. The robot arm 102 moves back and forth between the stamping press (or conveyor) and the stack of blanks 120 until all of the blanks 124 in the stack have been sequentially fed into the press. (Only portions of the robot 100 are shown via a schematic inset 11 for illustrative simplicity).

The material handling apparatus 10 may optionally include a controller 170 for actuating the jig 160 to move the stack of blanks 120 up and down along a Y-direction schematically depicted in the figures. The controller 170 is configured to move the jig 160 and position the stack of blanks 120 to a predetermined height (Y-direction) relative to the end-effector 110. A position sensor 180 may be disposed at the jig 160 and in communication with the controller 170. The position sensor 180 may be configured to transmit a signal corresponding to a position of the jig 160 to the controller 170 such that controller moves the jig 160 progressively upward (+Y-direction) as blanks 124 are removed from the stack of blanks 120.

Optionally, an air knife 150 may be included and configured to inject air into the stack of blanks 120 as the first blank 122 is grasped by the end-effector 110 and the blank 124 immediately below the first blank 122 is separated from the first blank 122 by a repulsive force F1 resulting from the impulse EGF as discussed in greater detail below. The robot 100 is configured to move the first blank 122, which has been separated from the stack of blanks 120, to a target site for a subsequent manufacturing operation.

Figure 2A:
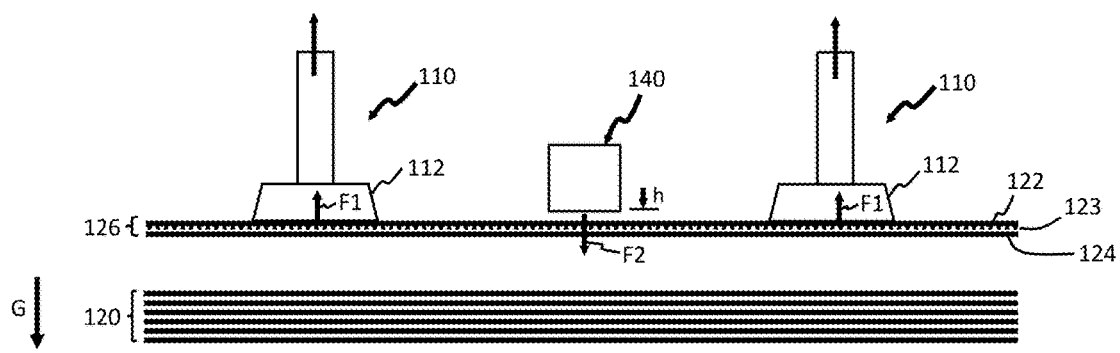
FIG. 2A is a schematic side view of the apparatus in FIG. 1 grasping and moving a first blank and at least one additional blank adhered to the first blank away from the stack of blanks in accordance with the teachings of the present disclosure.
Figure 2B:
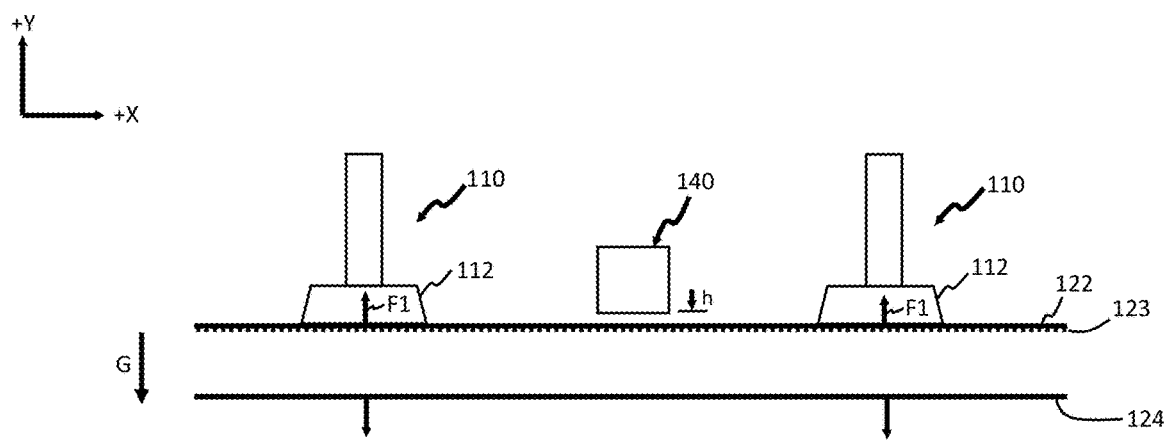
FIG. 2B is a schematic side view of the apparatus in FIG. 1 after applying at least one impulse electrically generated force (EGF) to the first blank and the at least additional blank adhered to the first blank in accordance with the teachings of the present disclosure.
Figure 3A:
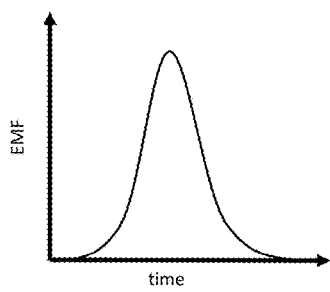
FIGS. 3A-3E are graphical views of a current pulse (FIG. 3A) and a sequence of current pulses (FIGS. 3B-3E) passing through at least one EGF generator in accordance with the teachings of the present disclosure.
Figure 3B:
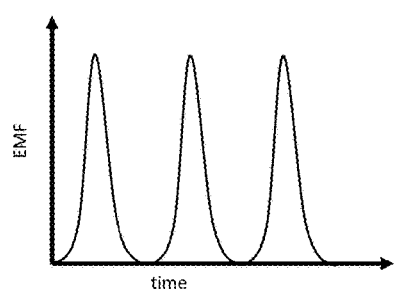
Figure 3C:
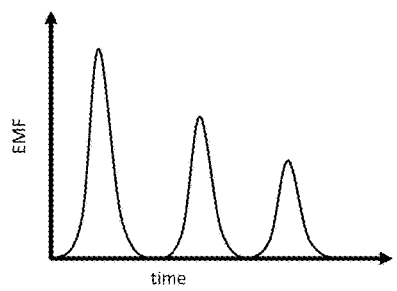
Figure 3D:
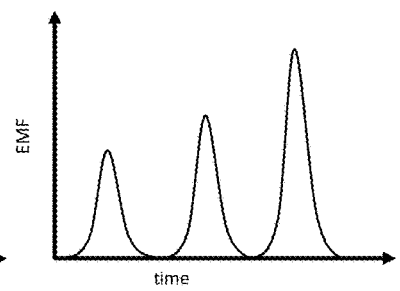
Figure 3E:
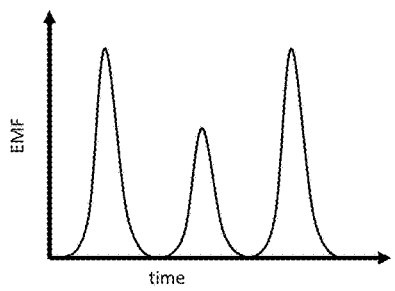

Referring now to FIGS. 1, 2A and 2B, the impulse EGF generator 140 may be positioned adjacent to the first blank and is used to remove unwanted blank(s) adhered (stuck) to the first blank 122. Particularly, the first blank 122 may be grasped and moved by the end-effector 110 such that the first blank 122 is separated from the remaining blanks 124 in the stack of blanks 120. However, in some instances, at least one additional blank 124 may be adhered to the first blank 122 thereby forming a sub-stack of blanks 126 as the first blank 122 is moved away from the stack of blanks 120. For example, a film, layer or partial layer of lubricant 123 used in the stamping process may be present between the blanks 124 such that surface tension between the blanks 124 and the lubricant 123 results in one or more additional blanks 124 being adhered to the first blank 122 as the first blank 122 is grasped and moved by the end-effector 110. In order to avoid inadvertent movement or more than one blank, e.g., to a stamping press, the EGF generator 140 generates at least one EGF with a force F2 within the sub-stack 126. The at least one EGF applies a repulsive force against the at least one additional blank 124 such that the at least one additional blank 124 in the sub-stack 126 moves away and is separated from the first blank 122 as schematically depicted in FIG. 2B.

In some aspects of the present disclosure, the at least one EGF elastically deforms, but does not plastically deform, the first blank 122 and/or the at least one additional blank 124 such that the "seal" (adherence) between the first blank 122 and the at least one additional blank 124 is broken and the at least one additional blank 124 is separated from the first blank 122. It should be understood that the at least one additional blank 124 separated from the first blank 122 (FIG. 2B) may move from the first blank 122 back to the stack of blanks 120 (not shown in FIG. 2B).

In some aspects of the present disclosure, the impulse EGF generator 140, and other impulse EGF generators disclosed herein, generate at least one impulse EGF each and every time the end-effector 110 grasps and moves a first blank 122 from a stack of blanks 120. In other aspects of the present disclosure, the material handling apparatus 10, and other material handling apparatuses disclosed herein, may include a "double blank" sensor 190, e.g., an eddy current sensor, configured to detect when at least one additional blank 124 is adhered to a first blank 122 when the first blank 122 is grasped and moved by the end-effector 110. In such aspects, i.e., when the double blank sensor 190 detects an extra blank has been grasped by the end-effector 110, the double blank sensor 190 may transmit a signal to an EGF generator controller 142 configured to activate the impulse EGF controller 140. Accordingly, the impulse EGF generator 140 generates at least one impulse EGF only when the first blank 122 needs to be separated from at least one additional blank 124.

The impulse EGF generator 140 may be spaced apart from the first blank 122 by a distance 'h' as schematically depicted in the figures. That is, the impulse EGF generator 140 may be positioned or attached to the material handling apparatus 10 such that it does not come into physical contact with the first blank 122. The distance h may be adjusted and set as a function of a desired EGF force to be applied to the sub-stack of blanks 126, the material of the blanks 124, the thickness of the blanks 124, the width and/or length of the blanks 124, and the like. In some aspects of the present disclosure the distance h may be between 0.1 millimeters (mm) and 10.0 mm, e.g., between 0.1 mm and 0.5 mm, 0.5 mm and 1.0 mm, 1.0 mm and 2.0 mm, 2.0 mm and 3.0 mm, 3.0 mm and 4.0 mm, 4.0 mm and 5.0 mm, 5.0 mm and 7.5 mm, or 7.5 mm and 10.0 mm.

Gravitational force G may assist in the further separation of the at least one additional blank 124 from the first blank 122 rather than separating individual blanks as with conventional blank separating equipment. For example, in some aspects of the present disclosure the first blank 122 is an upper (+Y-direction) blank 122 and the at least one additional blank 124 is adhered to a bottom surface of the upper blank 122 such that gravitational force G assists in separating the at least one additional blank 124 from the upper blank 122.

Referring now to FIGS. 3A-3E, the impulse EGF generator 140 may generate one or more impulse EGFs over a time period. For example, in some aspects of the present disclosure the impulse EGF 140 may generate a single impulse EGF over a time period as graphically depicted in FIG. 3A. In other aspects of the present disclosure, the impulse EGF generator 140 may generate a sequence of impulse EGFs as graphically depicted in FIGS. 3B-3E. For example, a sequence of impulse EGF's may include a plurality of EGFs that each have a magnitude that is generally equal to each other over a time period as graphically depicted in FIG. 3B, a plurality of EGFs that have a magnitude that decreases over a time period as graphically depicted in FIG. 3C, a plurality of EGFs that have a magnitude that increases over a time period as graphically depicted in FIG. 3D, and a plurality of EGFs that have a magnitude that modulates over a time period as graphically depicted in FIG. 3E. It should be understood that a single impulse EGF and/or a sequence of EGFs may be generated by passing a current pulse and/or a sequence of current pulses through the EGF generator 140. For example, a single current pulse may pass through the EGF generator 140 in order to generate the single impulse EGF graphically depicted in FIG. 3A. Also, a sequence of current pulses with a current magnitude that is generally equal over a time period may pass through the EGF generator 140 in order to generate the sequence of impulse EGFs graphically depicted in FIG. 3B. A sequence of current pulses with a current magnitude decreasing over a time period may pass through the EGF generator 140 in order to generate the sequence of impulse EGFs graphically depicted in FIG. 3C, a sequence of current pulses with a current magnitude increasing over a time period may pass through the EGF generator 140 in order to generate the sequence of impulse EGFs graphically depicted in FIG. 3D, and a sequence of current pulses with a current magnitude modulating over a time period may pass through the EGF generator 140 in order to generate the sequence of impulse EGFs graphically depicted in FIG. 3E. Also, a sequence of current pulses may pass sequentially through a plurality of EGF generators 140 as described in greater detail below.

As noted above, each of the impulse EGFs and/or each of the current impulses are not constant over a time period. The time period of one or more impulse EGFs and/or current impulses may be adjusted and set as a function the material of the blanks 124, the thickness of the blanks 124, the width and/or length of the blanks 124, and the like. In some aspects of the present disclosure the time period may be between 0.001 milliseconds (ms) and 10 ms, e.g., between 0.001 ms and 0.01 ms, 0.01 ms and 0.1 ms, 0.1 ms and 0.2 ms, 0.2 ms and 0.3 ms, 0.3 ms and 0.4 ms, 0.4 ms and 0.5 ms, 0.5 ms and 1.0 ms, 1.0 ms and 2.5 ms, 2.5 ms and 5.0 ms, or 5.0 ms and 10.0 ms.

Figure 4A:
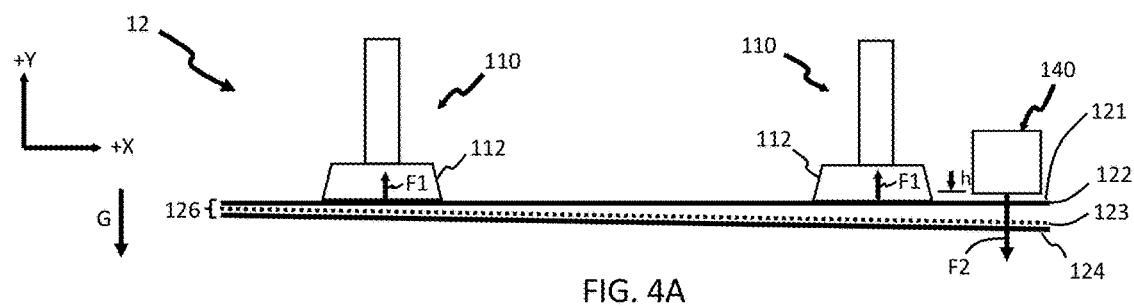
FIGS. 4A-4C are a schematic side view (FIG. 4A) and schematic top views (FIGS. 4B-4C) of apparatuses for separating a blank from a stack of blanks constructed in accordance with the teachings of the present disclosure.
Figure 4B:
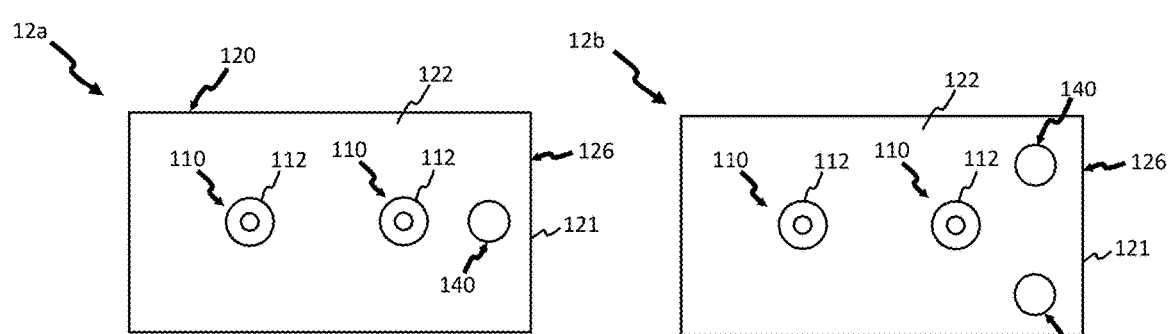
Figure 4C:
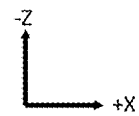

While FIGS. 2A-2B generally depict an EGF generator 140 positioned between a pair of end-effectors 110 and located generally at the middle (X-direction) of a first blank 122, it should be understood that an EGF generator 140 or a plurality of EGF generators 140 may be positioned at different locations across the first blank 122 as schematically depicted in FIGS. 4A-4C. Particularly, FIG. 4A schematically depicts a side view of a material handling apparatus 12 with an EGF generator 140 positioned or disposed along an edge 121 of the first blank 122. In some aspects of the present disclosure, a material handling apparatus 12a may include a single EGF generator 140 positioned or disposed along and positioned generally at the middle (Z-direction) of the edge 121 of the first blank 122 as schematically depicted in FIG. 4B. In other aspects of the present disclosure, a material handling apparatus 12b may include more than one EGF generator 140 positioned or disposed along the edge 121 of the first blank 122 as schematically depicted in FIG. 4C. As schematically depicted in FIG. 4A, the EGF generator 140 applies at least one impulse EGF with a force F2 to the sub-stack 120 such that the at least one additional blank 124 is moved away (i.e., separated) from the first blank 122.

It should be understood that the at least one impulse EGF may be generated and applied to the sub-stack of blanks 126 using a single impulse EGF generator 140 (FIG. 4B) or using more than one impulse EGF generator 140 (FIG. 4C). It should also be understood that the at least one impulse EGF may be a sequence of impulse EGFs generated by a single impulse EGF generator 140 (FIG. 4B) or generated by more than one impulse EGF generator 140 (FIG. 4C). Referring specifically to FIG. 4C, a sequence of impulse EGFs may comprise a plurality of impulse EGFs generated simultaneously at each of the impulse EGF generators 140. In the alternative, a sequence of impulse EGFs may comprise a plurality of impulse EGFs sequentially generated at the impulse EGF generators 140. For example, a first impulse EGF may be generated at one of the impulse EGF generators 140 and a second impulse EGF may be generated at the other impulse EGF generators 140. Also, such a sequence may be repeated in order to separate at least one additional blank 124 from a first blank 122.

Figure 5A:
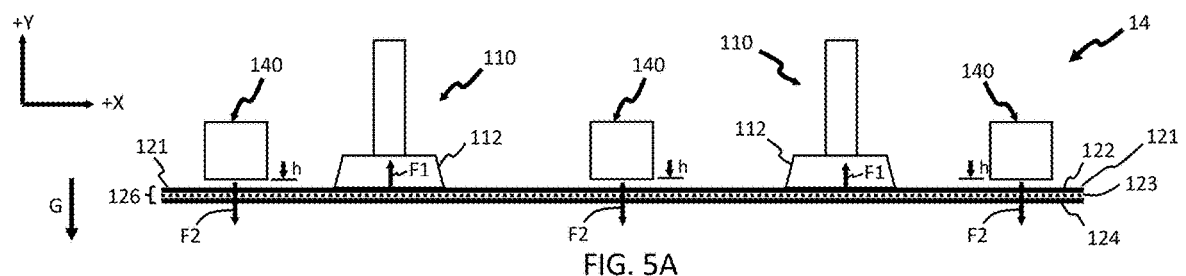
FIGS. 5A-5E are a schematic side view (FIG. 5A) and schematic top views (FIGS. 5B-5E) of apparatuses for separating a blank from a stack of blanks constructed in accordance with the teachings of the present disclosure.
Figure 5B:
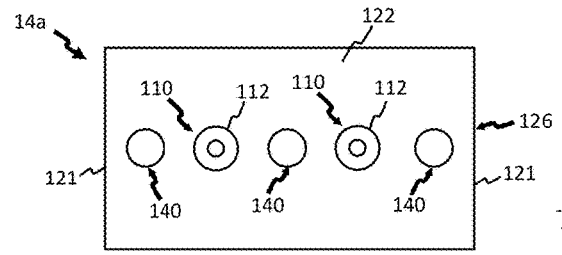
Figure 5C:
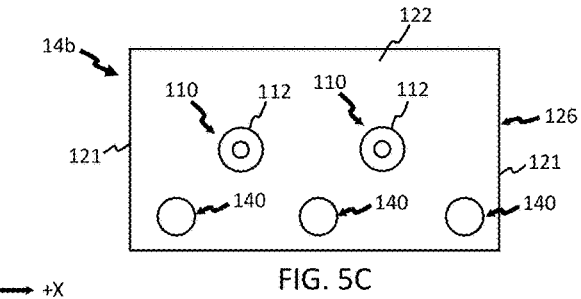
Figure 5D:
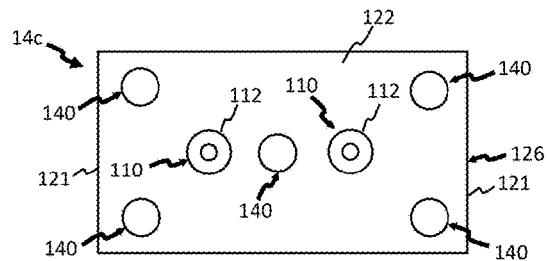
Figure 5E:
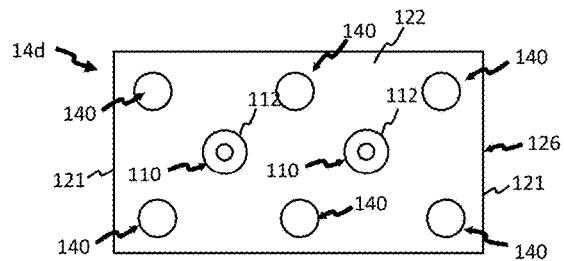

Referring now to FIGS. 5A-5E, other forms of a material handling apparatus are schematically depicted. Particularly, FIG. 5A schematically depicts a side view of a material handling apparatus 14 with a plurality of EGF generators 140 positioned along a length (X-direction) of the first blank 122. As shown in FIG. 5A, one EGF generator 140 is positioned between the pair of end-effectors 110, and a pair of EGF generators 140 are positioned or disposed along opposing edges 121 of the first blank 122. Also, FIGS. 5B-5E schematically depict the material handling apparatus 14 with the plurality of EGF generators 140 positioned at different locations along the first blank 122. For example, FIG. 5B schematically depicts a material handling apparatus 14a with three EGF generators 140 positioned generally co-linear along the length (X-direction) and generally at the middle of the width (Z-direction) of the first blank 122. FIG. 5C schematically depicts a material handling apparatus 14b with three EGF generators 140 positioned generally co-linear along the length (X-direction) and generally disposed along an edge 125 of the first blank 122. FIG. 5D schematically depicts a material handling apparatus 14c with five EGF generators 140 disposed in a matrix across the first blank 122 and FIG. 5E schematically depicts a material handling apparatus 14c with six EGF generators 140 disposed in a matrix across the first blank 122. It should be understood that other positions, configurations and/or number of EGF generators 140 are included within the scope of the present disclosure and that the end-effector(s) 110 and EGF generators 140 function and/or operate as described above with respect to FIGS. 1-4.

Similar to the generating and applying at least one impulse EGF to the sub-stack of blanks 126 described above with reference to FIG. 4C above, each of the impulse EGF generators 140 schematically depicted in FIGS. 5B-5E may generate a single impulse EGF or a sequence of impulse of EGFs. For example, and with reference to FIG. 5B, a first impulse EGF may be generated by the impulse EGF generator 140 on the left hand side of the figure, a second impulse EGF may be generated by the impulse EGF generator 140 in the middle of the figure, and third impulse EGF may be generated by the impulse EGF generator 140 on the right hand side of the figure. In some aspects of the present disclosure, the first, second and third impulse EGFs may be generated simultaneously by the three impulse EGFs schematically depicted in FIG. 5B. In other aspects of the present disclosure, the first, second and third impulse EGFs may be generated sequentially by the three impulse EGFs schematically depicted in FIG. 5B. For example, the left hand side of the at least one additional blank 124 may be initially separated from the first blank 122, followed by the middle of the at least one additional blank 124, and followed by the right hand side of the at least one additional blank 124. Such a sequence may provide the left hand side of the at least one additional blank 124 to be initially separated from the first blank 122, followed by the middle of the least one additional blank 124, and followed by the right hand side of the at least one additional blank 124 such that the at least one additional blank is "peeled" off of the first blank 122.

Figure 6:
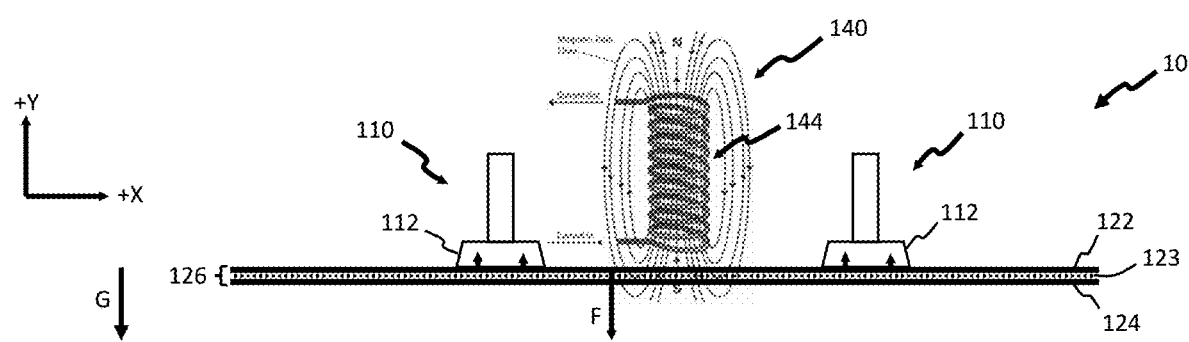
FIG. 6 is a schematic side view of an apparatus for separating a blank from a stack of blanks with an EGF generator in the form of a coil in accordance with the teachings of the present disclosure.
Figure 7:
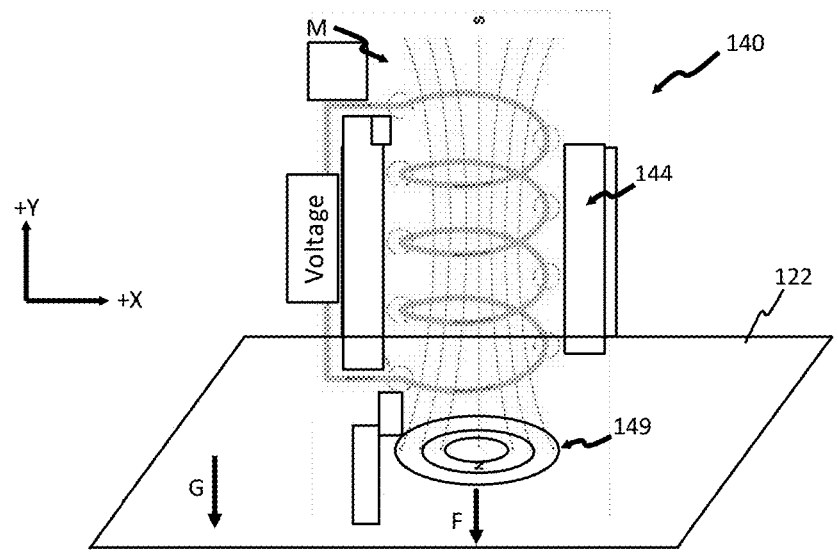
FIG. 7 is a schematic view of the coil in FIG. 6.

Referring now to FIGS. 6 and 7, in some aspects of the present disclosure one or more of the EGF generators 140 may be in the form of a coil 144. Eddy currents 149 resulting from current flowing through the coil 144 produce an EGF force vector F that functions to separate an unwanted blank 124 (not shown in FIG. 7) that is stuck to the first blank 122, from the first blank 122. The coil 144 is fixed relative to the first blank 122 and is configured such that the EGF force vector F generated by the eddy currents 149 pushes any unwanted and additional blank 124 that is adhered to the first blank 122 downward (−Y-direction) as shown in FIG. 7. As discussed above, movement of the additional blank 124 may be further assisted by the gravitational force G.

Accordingly, the coil 144 is configured such that the direction of the EGF force vector F resulting from the eddy currents 149 is downward (−Y-direction), e.g., in a gravitational direction G, as shown. The EGF force vector F may be in the range of 5 pounds (lbs) to 200 lbs depending on the application and may vary further from these exemplary values. In one form, the gravitational direction is between 90 degrees and 75 degrees as measured from a front face of a blank, and as illustrated in FIG. 7. Therefore, an unwanted blank that is stuck to the first blank 122 is moved away from the first blank 122 in the gravitational direction G. Concurrently and optionally, air may be injected into the stack (e.g., using the air knife 150) as individual blanks are separated by the repulsive force resulting from the coil 144.

While FIGS. 6 and 7 schematically depict a coil as an EGF generator, it should be understood that other types of EGF generators that provide an electrically generated force vector that pushes any unwanted and additional blank 124 adhered to a first blank 122 may be used as part of a material handling apparatus and/or method described in the present disclosure. Non-limiting examples of EGF generators include solenoids, electromagnets, toroids, piezoelectric generators, an assembly of rotating permanent magnets, and the like.

Figure 8:
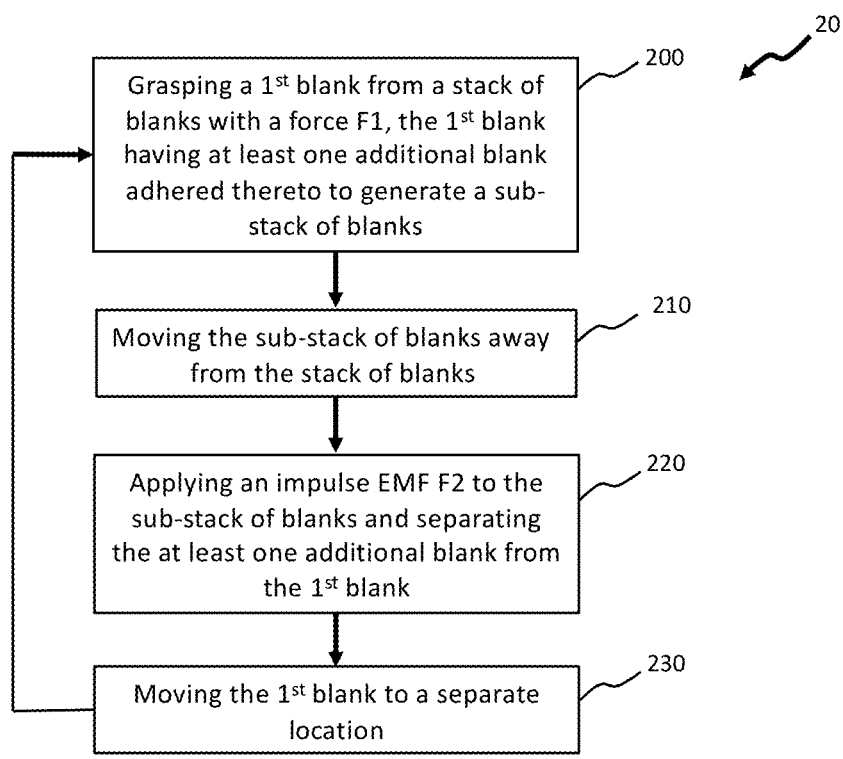
FIG. 8 is a flow diagram of a method for separating blanks from a stack in accordance with the teachings of the present disclosure.

Referring now to FIG. 8, a method 20 of separating a first blank 122 from a sub-stack of blanks 126 and moving the separated first blank 122 to a target site includes grasping a first blank 122 with a force F1 (FIG. 1) at step 200 and moving the first blank 122 away from a stack of blanks 120 (FIG. 2A) at step 210. At least one additional blank 124 is adhered to the first blank 122 such that a sub-stack of blanks 126 is formed when the first blank 122 is moved away from the stack of blanks 120. At least one impulse EGF with a force F2 is applied to the sub-stack of blanks 126 at step 220. The at least one impulse EGF may be less than the force F1 grasping the first blank 122 such that the at least one impulse EGF separates the at least one additional blank 124 from the first blank 122 but the first blank 122 remains grasped by an end-effector 110 (FIG. 2B). The first blank 122 separated from the at least one additional blank 124 is moved to a separate location at step 230. In some aspects of the present disclosure, the method 20 returns to step 200 where a new first blank 122, which was previously an additional blank 124, is grasped with the force F1 and the method proceeds through steps 200-230 until all of the blanks in the stack of blanks 120 have been moved, individually, to a separate location. It should be understood that a plurality of stacks of blanks 120 may be processed in this manner.

In one form of high-volume automotive production, a width of the blanks is between about 25 mm to about 3000 mm, a length of the blanks is between about 25 mm to about 300 mm, a thickness of each blank is between about 0.5 mm to about 6.0 mm, and a height of the stack of blanks is between about 6 mm to about 2000 mm.

The apparatuses and the methods of the present disclosure are intended to eliminate the need for compressed air, dimple patterns, or other typical methods to facilitate separation of the blanks in stamping or other operations. The apparatuses and the methods of the present disclosure separate unwanted blanks from a blank that has been grasped by an end-effector such that only one blank is removed from a stack of blanks and moved to a different location. The apparatuses and the methods of the present disclosure separate unwanted blanks from a blank grasped by an end-effector by applying an electrically generated force, e.g., an electromagnetic force, to the unwanted blank(s). The electrically generated force is a repulsive force that pushes the unwanted blank(s) away from the blank grasped by an end-effector.

As used herein, the phrase at least one of A and B should be construed to mean a logical (A OR B, OR A and B), using a non-exclusive logical OR, and should not be construed to mean "at least one of A and at least one of B."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of separating blanks comprising:
   grasping a first blank;
   moving the first blank away from a plurality of blanks, wherein at least one additional blank from the plurality of blanks is adhered to the first blank to form a sub-stack of blanks; and
   applying a sequence of impulse electrically generated forces (EGFs) within the sub-stack and separating to separate the at least one additional blank from the first blank.

2. The method of claim 1, wherein the first blank is grasped by a device with a force F1, and each of the sequence of impulse EGFs is less than the force F1.

3. The method of claim 1, wherein the sequence of impulse EGFs is applied to separate the at least one additional blank from the first blank by passing a sequence of current pulses through an EGF generator positioned adjacent the first blank and inducing the sequence of impulse EGFs within the sub-stack of blanks.

4. The method of claim 3, wherein the EGF generator comprises a coil positioned adjacent the first blank.

5. The method of claim 1, wherein a current magnitude in the sequence of impulse EGFs is selected from the group consisting of a current magnitude that increases over a time period, a current magnitude that decreases over a time period, and a current magnitude that is modulated over a time period.

6. The method of claim 1, wherein the sequence of impulse EGFs are generated by a plurality of impulse EGF generators spaced apart from each other and positioned adjacent the first blank.

7. The method of claim 6, wherein the plurality of impulse EGF generators are activated in a sequence to apply the sequence of impulse EGFs to separate the at least one additional blank from the first blank.

8. The method of claim 6, wherein the plurality of impulse EGF generators are disposed along edges of the first blank.

9. The method of claim 6, wherein the plurality of impulse EGF generators are disposed in a matrix across the first blank.

10. The method of claim 1, wherein the sequence of impulse EGFs is created by flowing a sequence of current pulses through an EGF generator coupled to a device that grasps the first blank.

11. The method of claim 1, wherein the sequence of impulse EGFs is created by flowing a sequence of current pulses through an EGF generator disposed proximate a device that grasps the first blank.

12. The method of claim 1, wherein the sequence of impulse EGFs is applied by an impulse EGF generator that does not contact the blanks.

13. The method of claim 1 further comprising detecting the at least one additional blank adhered to the first blank with a double blank sensor before applying the sequence of impulse EGFs, wherein sequence of impulse EGFs elastically deforms, but does not plastically deform, at least one of the first blank and the at least one additional blank.

14. A method of separating blanks comprising:
    grasping a first blank;
    moving the first blank away from a plurality of blanks, wherein at least one additional blank from the plurality of blanks is adhered to the first blank to form a sub-stack of blanks separated from a remaining plurality of blanks;
    detecting the at least one additional blank adhered to the first blank with a double blank sensor; and
    passing current through a plurality of electrically generated force (EGF) generators spaced apart from each other and positioned adjacent the first blank, wherein the current passing through the plurality of EGF generators generates a sequence of EGFs within the sub-stack to separate the at least one additional blank from the first blank.

15. The method of claim 9, wherein the plurality of EGF generators is selected from the group consisting of a plurality of impulse EGF generators disposed along edges of the first blank and a plurality of impulse EGF generators disposed in a matrix across the first blank.

16. A method of separating blanks comprising:
    grasping a first blank with a force F1;
    moving the first blank away from a plurality of blanks, wherein at least one additional blank is adhered to the first blank to generate a sub-stack of blanks separated from a remaining plurality of blanks;
    detecting the at least one additional blank adhered to the first blank with a double blank sensor; and
    generating a sequence of impulse electrically generated forces (EGFs) within the sub-stack of blanks by at least one EGF generator positioned adjacent the first blank only when the at least one additional blank is detected with the double blank sensor, wherein each of the sequent of impulse EGFs is less than the force F1 and separates the at least one additional blank from the first blank.

17. The method of claim 16, wherein the plurality of impulse EGFs is generated by a plurality of EGF generators spaced apart from each other and positioned adjacent the first blank.

* * * * *